(12) United States Patent
Beyer

(10) Patent No.: US 10,315,672 B2
(45) Date of Patent: Jun. 11, 2019

(54) METHOD FOR PROVIDING A DIAGNOSTIC MESSAGE IN A RAIL VEHICLE

(71) Applicant: SIEMENS AKTIENGESELLSCHAFT, Munich (DE)

(72) Inventor: Ralf Beyer, Moehrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 215 days.

(21) Appl. No.: 15/305,366

(22) PCT Filed: Mar. 31, 2015

(86) PCT No.: PCT/EP2015/056980
§ 371 (c)(1),
(2) Date: Oct. 20, 2016

(87) PCT Pub. No.: WO2015/161992
PCT Pub. Date: Oct. 29, 2015

(65) Prior Publication Data
US 2017/0050652 A1 Feb. 23, 2017

(30) Foreign Application Priority Data
Apr. 25, 2014 (DE) .................. 10 2014 207 828

(51) Int. Cl.
*B61K 9/00* (2006.01)
*B61L 3/00* (2006.01)
(Continued)

(52) U.S. Cl.
CPC .......... *B61L 15/0081* (2013.01); *B61D 19/02* (2013.01); *B61K 9/00* (2013.01);
(Continued)

(58) Field of Classification Search
CPC .. B61L 15/0081; B61L 15/0072; B61L 3/002; B61K 9/00; B61D 19/02
See application file for complete search history.

(56) References Cited

U.S. PATENT DOCUMENTS 8,532,871 B2 * 9/2013 Okada .................... G01C 21/36
345/7
2003/0222981 A1* 12/2003 Kisak .................. B61L 15/0027
348/148
(Continued)

FOREIGN PATENT DOCUMENTS

DE 112008001396 T5 3/2010
WO 2005058668 A2 6/2005
WO 2011148394 A1 12/2011

*Primary Examiner* — Jason C Smith
(74) *Attorney, Agent, or Firm* — Laurence Greenberg Werner Stemer; Ralph Locher

(57) ABSTRACT

A method for providing a diagnostic message associated with at least one process in a rail vehicle, includes using at least one device of the vehicle to carry out the process, using a diagnostic device of the vehicle associated with the process to produce at least one diagnostic report, and using a data acquisition device to acquire at least one environment dataset. In order to keep the time required for the preprocessing of the information content short despite high data volume, the data acquisition device includes at least one image and/or sound-recording unit. Image and/or sound data being recorded by the image and/or sound-recording unit, the environment dataset containing image and/or sound data, the diagnostic report and the environment dataset are combined by an aggregation unit of the vehicle to produce the diagnostic message. A rail vehicle having an apparatus providing a diagnostic message is also provided.

11 Claims, 3 Drawing Sheets

(51) Int. Cl.
*G06K 9/00* (2006.01)
*H04N 7/18* (2006.01)
*B61D 19/02* (2006.01)
*B61L 15/00* (2006.01)

(52) U.S. Cl.
CPC ........... *B61L 3/002* (2013.01); *B61L 15/0072* (2013.01); *G06K 9/00771* (2013.01); *G06K 9/00791* (2013.01); *H04N 7/181* (2013.01)

(56) References Cited

U.S. PATENT DOCUMENTS

2008/0103648 A1\* 5/2008 Kanner ................. B61L 29/243
 701/19
2010/0020175 A1\* 1/2010 Takada ..................... H04N 5/76
 348/148
2017/0050652 A1\* 2/2017 Beyer ................ G06K 9/00771

\* cited by examiner

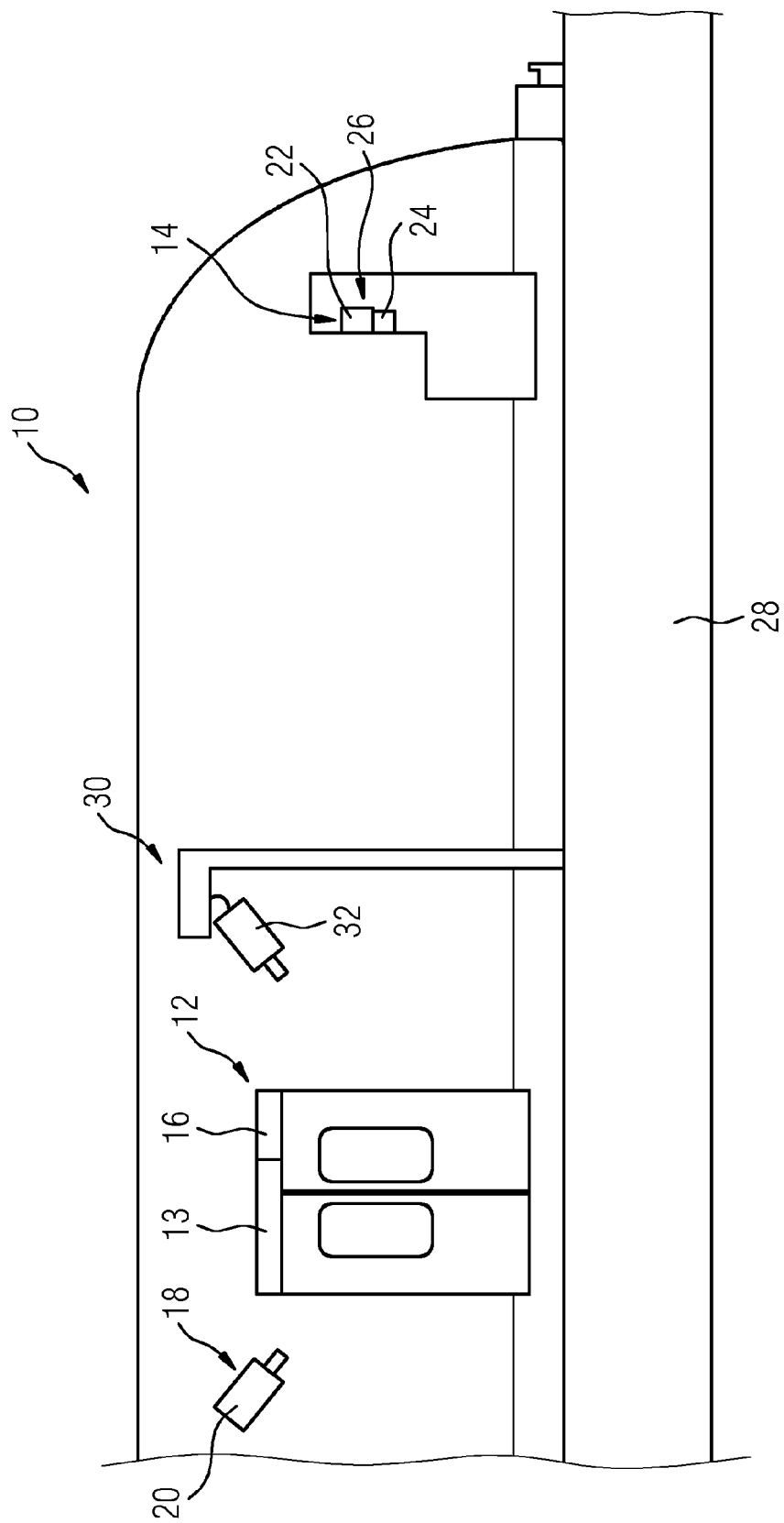

METHOD FOR PROVIDING A DIAGNOSTIC MESSAGE IN A RAIL VEHICLE

BACKGROUND OF THE INVENTION

Field of the Invention

The invention relates to a method for providing a diagnostic message, which is assigned to at least one process in a rail vehicle, in which the process is executed by at least one device of the rail vehicle, a diagnostic device of the rail vehicle assigned to the process generates at least one diagnostic report and at least one environment dataset is acquired by a data acquisition device.

The generation of automatic diagnostic messages plays an increasing role now in the operation and maintenance of a fleet of rail vehicles. At least one diagnostic device, which has the function of generating corresponding, predefined diagnostic reports when certain events occur, is assigned to the majority of control processes.

Environment data is also acquired, which serves to this end to extend the information content provided by diagnostic reports. This is required e.g. in the UIC 557 and VDV 166 standards. Messages which are directed at the vehicle driver, the train conductor or at a workshop employee are typically established by linking individual diagnostic reports with the environment data, wherein the entire information content is analyzed in order to reconstruct a process flow which can be reproduced by the target person. For instance, environment data can comprise acquired speed, delay, temperature, position, pressure, power and/or voltage parameters, which serve e.g. to determine a current operating state of the rail vehicle or a device of the same, which corresponds in particular to the at least one device for realizing at least one subprocess of the process.

BRIEF SUMMARY OF THE INVENTION

The object underlying the invention is to provide a generic method for producing a diagnostic message, in which the information density can be increased and the processing outlay can thus be kept to a minimum.

To this end it is proposed that the data acquisition device has at least one image and/or sound recording unit, wherein image and/or sound data is recorded by the image and/or sound recording unit and the environment dataset contains the image and/or sound data and the diagnostic report and the environment dataset are aggregated by an aggregation unit of the rail vehicle in order to form the diagnostic message. In this way a diagnostic message with a particularly high information content relating to the circumstances of a specific event in the process flow can be provided, wherein the information content produced from the at least one diagnostic report and the environment dataset can already be processed onboard the rail vehicle. As a result, the effort required to process the information content and to form the diagnostic message can be kept to a minimum at least in two respects. As a result of the aggregation taking place in the rail vehicle, a transfer of the information over long communication paths, such as e.g. a transfer to a land-side evaluation device, can be avoided on the one hand. On the other hand, processing the information in the vicinity of the data sources has the advantage of a local association of the data with one another, which is firstly to be produced during a processing at a remote location, at a subsequent point in time, and/or as an integral part of a significant quantity of collected information. By means of a local and rapid processing of the information content, the diagnostic message can be conveyed to a target person after a short period of time, who can thus implement an action, possibly rapidly, in conjunction with an occurred event.

The image and/or sound data is advantageously recorded during the process. Since image and/or sound data has a high information density, a particularly high data volume can be generated, which is advantageously processed locally in the rail vehicle together with the corresponding at least one diagnostic report. With a data transmission, image and/or sound data requires a particularly high bandwidth, which may, in some instances, not be present when the rail vehicle communicates with the land side. The image and/or sound recording unit can be embodied as a camera, video camera and/or microphone.

The device is provided to realize at least one subprocess of the process, in particular it can be provided to realize the entire process. It may have a hardware actuator unit, in particular a drive unit for performing actuation steps and/or at least one control unit, which is assigned to at least one such actuator unit and/or a computing unit, which realizes a software control process.

A diagnostic report is in particular a report which is selected in a set of predefined or preformulated abbreviated reports. This set, which is preferably assigned to the process, is assigned to a quantity of predefined events, which may potentially occur during the course of the corresponding process. In this set, each report is accordingly expediently assigned to at least one of these predefined events in the process flow. The definition of a set of diagnostic reports depends on the respective process. Predefined diagnostic reports preferably have a format which is defined in advance. Here the diagnostic reports in particular have an information content, which is substantially restricted to the identifier of an occurred event. The diagnostic report can refer here exclusively to the event, however, it is advantageous if the diagnostic report refers to a device and an event which occurs with this device. Typical formulations are e.g. "Device A reports a fault", "Device B has triggered", "Device C reports successful completion of process X" etc. A diagnostic report is therefore preferably generated by the diagnostic device or by a control unit of the same, e.g. by a processor unit, when a predetermined event occurs.

In comparison, environment data is preferably data which is acquired by the data acquisition device. The diagnostic device and the data acquisition device are preferably different units. The environment data is expediently provided to be linked together with one or a number of diagnostic reports. In particular, "environment data" may be understood to mean environment data within the meaning of the UIC 557 and/or VDV 166 standard.

An "aggregation" of the at least one diagnostic report with the environment dataset is to be understood to mean in particular the formation of a data bundle at least from this data, which is appropriate for forming a e.g. visual and/or acoustic diagnostic message which is intelligible to a target person. A diagnostic message is expediently formed on the basis of the aggregation of the at least one diagnostic report with the environment dataset. It serves to provide an item of information which can be reproduced by a target person and relates to the flow of the process, in particular to the circumstances, preferably the cause of a specific event in the process flow, which is signaled by the diagnostic report.

In an advantageous embodiment of the invention, it is proposed that the aggregation of the at least one diagnostic report and the environment dataset follow on from the acquisition of the environment dataset. As a result, compared with a solution in which an analysis of the information content takes place at a subsequent point in time and therefore the processing firstly comprises a bringing together of the information from the various data sources, time and processing effort are saved. In particular, the aggregation can be realized immediately and/or directly after acquiring the environment dataset. It is also conceivable for the aggregation to be triggered already during the acquisition of the environment dataset.

The acquisition of the environment dataset by the data acquisition device preferably depends on the generation of the at least one diagnostic report. The generation of a diagnostic report can advantageously trigger an acquisition process of environment data. If a diagnostic report relating to a device of the rail vehicle is generated, an acquisition process of data intentionally relating to the environment of the device and/or parameters, which are relevant to the operation of the device, can be triggered. The environment data record assigned to a device has a higher information content compared with a diagnostic report relating to this device. As a result, during the course of a process, a high data volume can be generated, which can be traced back to the acquisition of environment datasets.

In an advantageous development of the invention, it is proposed that the data acquisition device is a landfast device. An existing, fixed infrastructure can be advantageously used here to acquire environment data. For instance, the image and/or sound recording unit can be formed by a fixed device on a train platform, wherein the data recorded while the rail vehicle is stopped at this train platform can be transmitted to a unit of the rail vehicle, in particular directly to the aggregation unit.

One embodiment is possible, however, in which the data acquisition device is arranged in the rail vehicle and assigned to the at least one device which is involved in the realization of the process.

It is especially proposed that the data acquisition device is at least partially an integral part of the device. In this way the device can be used both to execute at least one subprocess of the process and also to acquire an environment dataset in conjunction with an event in the process flow, as a result of which components and installation space can be saved. In particular, the data acquisition device can be formed by the device, comprised by the device or correspond to the device.

Particularly advantageously the image and/or sound recording unit monitors the interior of the vehicle or the vehicle surroundings. In particular, the image and/or sound recording unit may be an integral part of a CCTV system ("Closed Circuit Television"). The monitoring advantageously takes place during the process.

One embodiment of the data acquisition device as an image and/or sound recording unit is particularly suitable for realizing the invention, in which the process is embodied as an authentication process for authenticating a person and the device is embodied as an authentication device. For instance, the authentication process can serve to authenticate a specific person of the on-board personnel, in particular the train driver. The image and/or sound recording unit can be provided to record image data relating to a body feature of the person, such as e.g. relating to the face or a fingerprint.

In this context it is proposed that the image and/or sound recording unit is an integral part of the authentication device. In particular, image and/or sound data recorded by this unit can be used both to implement the authentication and also as environment data assigned to the authentication process.

In a further advantageous embodiment of the invention, it is proposed that the process is embodied as a check-in procedure prior to departure of the rail vehicle from a station. A process of this type depends on a plurality of conditions, as a result of which a high data volume can typically be generated in conjunction with this process.

In this context it is proposed that the device is embodied as a door device, the image and/or sound recording unit records image and/or sound data during a door closing procedure and the diagnostic device generates a diagnostic report relating to a pinch event during the door closing procedure.

The invention further relates to a rail vehicle having an apparatus for providing a diagnostic message, at least one device which is provided to realize at least one subprocess of a process, a diagnostic device assigned to the process, which is provided to generate at least one diagnostic report, at least one data interface for communication with a data acquisition device, which is provided to acquire an environment image data record and at least one image and/or sound recording unit, wherein the environment data record contains the image and/or sound data, wherein the apparatus has an aggregation unit which is provided to aggregate the diagnostic report and the environment data record in order to form the diagnostic message. In respect of the advantageous effects of the inventive rail vehicle, reference is made to the embodiments above relating to the proposed method.

BRIEF DESCRIPTION OF THE SEVERAL VIEWS OF THE DRAWING

An exemplary embodiment of the invention is explained in more detail on the basis of the drawings, in which:

FIG. 3: shows the rail vehicle from FIG. 1 when stopped at a platform, which is equipped with a fixed data acquisition device.

DESCRIPTION OF THE INVENTION

Figure 1:
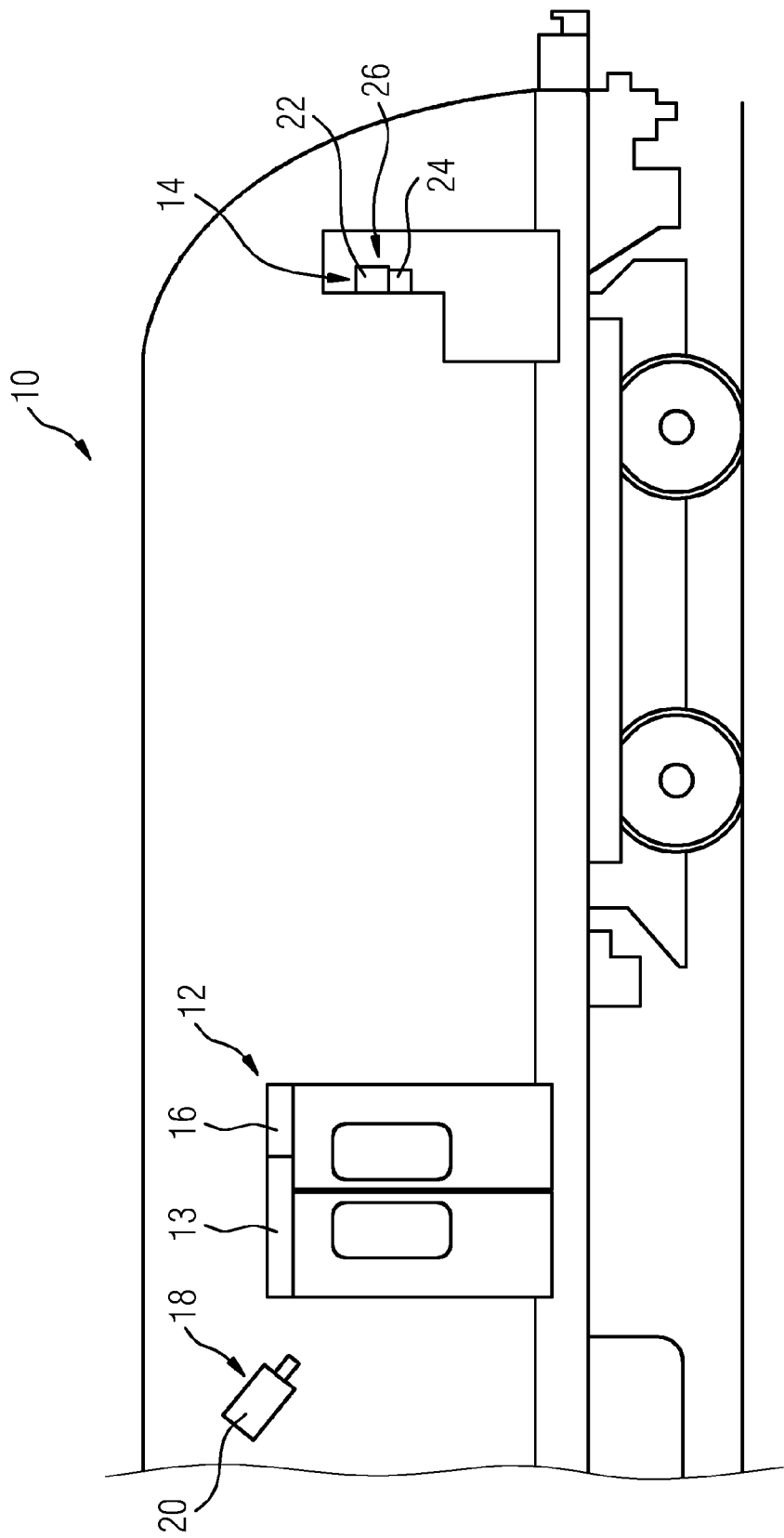
FIG. 1: shows a rail vehicle with a door device, an authentication device and assigned diagnostic and data acquisition devices.

FIG. 1 shows a rail vehicle 10 in a schematic side view. In the embodiment considered, the rail vehicle 10 is embodied as a trainset, which is provided to transport passengers. In a further embodiment, the rail vehicle 10 can be embodied as an individual locomotive or as an assembly consisting of a locomotive and a number of passenger cars and/or goods wagons.

As is known, the rail vehicle 10 has a number of devices which are each provided to realize at least one process. In particular, the rail vehicle 10 comprises a drive device, a brake device, a control device for inputting control commands by the train driver, an illumination device, a passenger information device, sanitary module devices, door devices etc., wherein these devices themselves can consist of a number of subordinate devices.

In this description, two special devices 12 and 14 of the rail vehicle 10 are taken into account, which are embodied as the door device or authentication device.

In respect of the device 12 embodied as a door device, a check-in procedure prior to departure of the rail vehicle 10 from a station is in particular considered to be a process. A successfully concluded door closing procedure is, as known, a precondition for the departure of the rail vehicle 10. This departure is then only possible once the rail vehicle doors are locked, i.e. can no longer be activated by the passengers. The process of the check-in procedure comprises at least the closing process of the rail vehicle doors, which is realized by the device 12. The device 12 comprises door bodies and a drive unit 13 for driving the door bodies.

A diagnostic device 16 which is an integral part of a pinch protection device is assigned to the door closing process as a subprocess of the check-in procedure. This diagnostic device 16 is provided to register a pinch event by a diagnostic report DM1 "Pinch protection has triggered" being generated upon recognition of such a pinch event. It is fundamentally not possible from this diagnostic report DM1 alone to obtain information relating to the circumstances, in particular the cause of the pinch event.

To this end, a data acquisition device 18 of the rail vehicle 10 is provided, which is assigned to the device 12 and serves to acquire an environment dataset UD1 relating to the environment of a door closing procedure with the device 12.

In the considered example of the device 12, the data acquisition device 18 has an image recording unit 20, which monitors the interior of the vehicle in the entrance/exit area at least during the process of the check-in procedure, in particular of the door closing procedure. In particular, the image recording unit 20, which is embodied as a video camera for instance, is an integral part of a CCTV system of the rail vehicle 10. The data acquisition device 18 monitors the environment of the device 12 and can thus acquire environment data relating to the environment of the door closing procedure. The image data recorded during the door closing procedure therefore forms an environment dataset UD1.

On the basis of the environment dataset UD1, it is possible to generate a piece of information relating to the type and cause of a pinch event. By aggregating the diagnostic report DM1 "Pinch protection has triggered" and the recorded image data of the data acquisition device 18, a diagnostic message DN1 can be provided, by means of which the vehicle driver is not only informed of the occurrence of a pinch event, but also of the circumstances, in particular the causes of this event. For instance, the diagnostic message DM1 can trigger an indicator on a display of the control device of the train driver, with which the diagnostic report DM1 is shown together with a recorded image. It is thus possible for the train driver to identify the cause of the pinch event.

Figure 2:
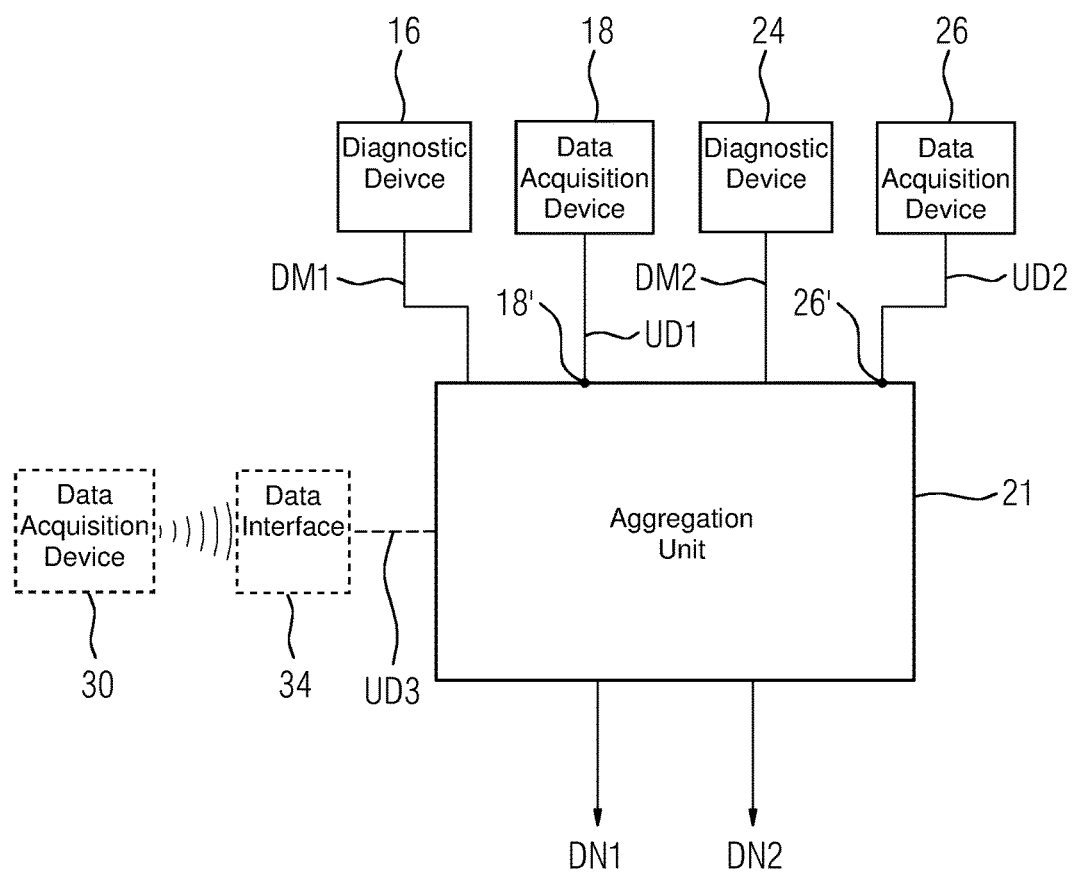
FIG. 2: shows a schematic view of the diagnostic and data acquisition devices and an aggregation unit

FIG. 2 shows a schematic representation of the diagnostic device 16, the data acquisition device 18 and an aggregation unit 21, which is arranged in the rail vehicle 10 and serves to aggregate the diagnostic report DM1 and the environment dataset UD1 in order to form the diagnostic message DN1. The process of aggregation follows on from the acquisition process of the data acquisition device 18, wherein the aggregation is triggered as soon as the acquisition procedure is ended or is still being realized. An evaluation of the data originating from the various data sources described, in which an assignment of the environment dataset to the diagnostic report takes place, is not necessary and can be spared.

In respect of the device 14 embodied as an authentication device, the authentication of a person of the onboard personnel, in particular of the train driver, is taken into account particularly as one process. The device 14 is an integral part of the control device for the train driver or is integrated in what is known as the "operating console". It has an image recording unit 22, which is provided to record a body feature, in particular the face of the person checking in. With the aid of a database of authorized persons, the recorded image data is used to authenticate the train driver, which, if successful, results in an upgrade of the rail vehicle 10 being approved.

A diagnostic device 24 is assigned to the authentication process, said diagnostic device generating a diagnostic report DM2 "Train driver authentication successful" or "Train driver authentication failed". It is fundamentally not possible from this diagnostic report DM2 alone to obtain information relating to the circumstances of an authentication error.

To this end, a data acquisition device 26 is provided, which is assigned to the device 12 and serves to acquire an environment dataset UD2 relating to the environment of the authentication procedure of the device 14. The data acquisition device 26 has the image recording unit 22 of the device 14, i.e. the device 14 and the data acquisition device 26 both comprise the image recording unit 22. The data acquisition device 26 thus has at least one part which is the integral part of the device 14. The image data recorded relating to the authentication process thus serves also to form an environment dataset UD2.

On the basis of the environment dataset UD2, it is possible to generate a piece of information relating to the error of an authentication process. By aggregating the diagnostic report DM2 "Train driver authentication failed" and the recorded image data of the data acquisition device 26, i.e. of the environment dataset UD2, a diagnostic message DN2 can be provided, by means of which the train driver is not only informed of the failed authentication process but also of the circumstances, in particular the cause of this event. For instance, the diagnostic message DM2 can trigger an indicator on a display of the control device of the train driver, with which the diagnostic report DM2 is shown together with the image recorded by the image recording unit 22. It is possible for the train driver to identify the cause of the error, such as e.g. an unsuitable orientation of the face relative to the image recording unit 22 or unsuitable light ratios.

The diagnostic device 24, the data acquisition device 26 together with the aggregation unit 21, which serves to a aggregate the diagnostic report DM2 and the environment dataset UD2 in order to form the diagnostic message DN2, are also shown in FIG. 2.

The diagnostic devices 16, 24 and the data acquisition devices 18, 26 are actively connected to the aggregation unit 21. Inputs of the aggregation unit 21, which are connected to the data acquisition device 18 or the data acquisition device 26, each form a data interface 18' or 26', by way of which the corresponding environment dataset UD1, UD2 can be received by the aggregation unit 21.

FIG. 3 shows the rail vehicle 10 from FIG. 1, which stops on a platform 28 of a station. The station is video-monitored, wherein at least one data acquisition device 30 fixed to the platform 28 is provided with an image recording unit 32 in the form of a CCTV camera. This may be in particular an integral part of a land-side, networked monitoring system. By means of the image recording unit 32, the vehicle surroundings, in particular the outer door area, can be monitored, wherein the recorded data can be used as environment data for the door closing procedure described above. A data communication takes place here between the land-side data acquisition device 30 and a data interface 34 of the rail vehicle 10, which is actively connected to the aggregation unit 21 (see FIG. 2). The diagnostic report DM1 can be aggregated with the environment dataset UD1 and/or with an environment dataset UD3 acquired by the data acquisition device 30 and received by way of the vehicle-side data interface 34 in order to form the diagnostic message DN1. A number of environment datasets UD1, UD3, which are acquired by different data acquisition devices 18, 30, can therefore be aggregated with the same diagnostic report DM1 in order to form a diagnostic message DN1 particularly in the considered embodiment and also generally in further conceivable embodiments of the invention.

The invention claimed is:

1. A method for providing a diagnostic message assigned to at least one process in a rail vehicle, the method comprising the following steps:
    using at least one device of the rail vehicle to carry out the process;
    using a diagnostic device of the rail vehicle assigned to the process to generate at least one diagnostic report;
    using a data acquisition device to acquire at least one environment dataset, the data acquisition device having at least one recording unit for at least one of image or sound;
    using the at least one recording unit for at least one of image or sound to record at least one of image or sound data contained in the at least one environment dataset;
    using an aggregation unit of the rail vehicle to aggregate the at least one diagnostic report and the at least one environment dataset to form the diagnostic message; and
    using the aggregation unit to form a data bundle from the data and to form the diagnostic message based on the aggregation of the at least one diagnostic report with the environment dataset.

2. The method according to claim 1, wherein the aggregation of the at least one diagnostic report and the environment dataset follows the acquisition of the environment dataset.

3. The method according to claim 1, wherein the data acquisition device is a land-fixed device.

4. The method according to claim 1, wherein the data acquisition device is disposed in the rail vehicle and is assigned to the at least one device.

5. The method according to claim 4, wherein the data acquisition device is at least partially an integral part of the at least one device.

6. The method according to claim 1, wherein the at least one recording unit for at least one of image or sound monitors an interior of the vehicle or surroundings of the vehicle.

7. The method according to claim 1, wherein the process is an authentication process used to authenticate a person and the at least one device is an authentication device.

8. The method according to claim 7, wherein the at least one recording unit for at least one of image or sound is an integral part of the authentication device.

9. The method according to claim 1, wherein the process is a check-in procedure performed prior to the rail vehicle departing from a station.

10. The method according to claim 6, wherein the at least one device is a door device, the at least one recording unit for at least one of image or sound records at least one of image or sound data during a door closing procedure, and the diagnostic device generates the at least one diagnostic report relating to a pinch event during the door closing procedure.

11. A rail vehicle, comprising:
    an apparatus for providing a diagnostic message;
    at least one device configured to carry out at least one subprocess of a process;
    a diagnostic device assigned to the process and configured to generate at least one diagnostic report;
    a data acquisition device for acquiring an environment dataset, said data acquisition device having at least one recording unit for image or sound, said environment dataset containing at least one of image or sound data;
    at least one data interface for communication with said data acquisition device; and
    said apparatus having an aggregation unit for aggregating the diagnostic report and the environment dataset to form the diagnostic message, said aggregation unit forming a data bundle from the data and forming the diagnostic message based on the aggregation of the at least one diagnostic report with the environment dataset.

* * * * *